(12) United States Patent
Yusuf et al.

(10) Patent No.: US 9,800,330 B1
(45) Date of Patent: Oct. 24, 2017

(54) METHODS AND SYSTEMS FOR PROVIDING A FIBER OPTIC CABLE NETWORK TESTING PLATFORM

(71) Applicant: MICROSOFT TECHNOLOGY LICENSING, LLC, Redmond, WA (US)

(72) Inventors: Faraz Yusuf, Seattle, WA (US); Adrian Lindsay Power, Seattle, WA (US); Peter John Hill, Seattle, WA (US); Mikhail Ivan Cherniak, Kitchener (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/145,621

(22) Filed: May 3, 2016

(51) Int. Cl.
  *H04B 10/07* (2013.01)
  *H04B 10/079* (2013.01)
  *G02B 6/42* (2006.01)

(52) U.S. Cl.
  CPC ....... *H04B 10/0793* (2013.01); *G02B 6/4215* (2013.01); *G02B 6/4292* (2013.01); *H04B 10/07953* (2013.01)

(58) Field of Classification Search
  CPC ............................... H04B 10/079; G02B 6/42
  USPC .......................................................... 398/27
  See application file for complete search history.

(56) References Cited

U.S. PATENT DOCUMENTS

| | | | |
|---|---|---|---|
| 6,801,306 B2 | 10/2004 | Fontaine | |
| 7,079,743 B2 | 7/2006 | Lauzier et al. | |
| 7,373,069 B2 * | 5/2008 | Lazo | G01M 11/30 385/134 |
| 8,558,992 B2 | 10/2013 | Steffey | |
| 8,577,212 B2 | 11/2013 | Thiel | |

(Continued)

FOREIGN PATENT DOCUMENTS

| | | |
|---|---|---|
| EP | 1317088 A1 | 6/2003 |
| KR | 20110101726 A | 9/2011 |

OTHER PUBLICATIONS

Hayes, Jim., "The Tester in Your Pocket", Published on: Dec. 2011 Available at: http://www.ecmag.com/section/systems/tester-your-pocket.

(Continued)

*Primary Examiner* — Don N Vo
(74) *Attorney, Agent, or Firm* — Shook, Hardy & Bacon L.L.P.

(57) ABSTRACT

In embodiments, methods and systems for implementing fiber optic cable network testing using a fiber optic cable network testing platform are provided. A fiber optic cable network testing adapter assembly comprises an attachment and a port. The attachment attaches the adapter assembly to a mobile device and the port receives a fiber optic cable. A fiber optic cable network testing application receives, via a camera of the mobile device, light data from the cable. The fiber optic cable is coupled to the port to transmit the light data to the application. The application is part of the fiber optic cable network testing platform, the platform provides integrated fiber optic cable network testing. The application analyzes the light data based on a fiber optic cable network testing option to generate testing results data. The application communicates the testing results data using an interface to facilitate presenting the testing results data.

20 Claims, 6 Drawing Sheets

(56) References Cited

U.S. PATENT DOCUMENTS

| | | |
|---|---|---|
| 9,151,694 B2 | 10/2015 | Wilson et al. |
| 2005/0083067 A1* | 4/2005 | Kirbas ................ G01R 31/023 |
| | | 324/539 |
| 2012/0214515 A1* | 8/2012 | Davis .................. H04W 4/023 |
| | | 455/456.3 |
| 2013/0013268 A1* | 1/2013 | Woolf .................... G06F 17/50 |
| | | 703/1 |
| 2013/0027576 A1 | 1/2013 | Ryan et al. |
| 2015/0103336 A1 | 4/2015 | Rolston et al. |
| 2015/0116699 A1 | 4/2015 | Meek et al. |

OTHER PUBLICATIONS

McLaughlin, et al.,"Use your smartphone as a fiber optic tester", Published on: Sep. 24, 2010 Available at: http://www.cablinginstall.com/articles/2010/09/use-your-smartphone-as-a-fiber-optic-tester.html.

Torlak, Murat., "Fiber Optic Communications", Published on: Feb. 27, 2012 Available at: https://www.utdallas.edu/~torlak/courses/ee4367/lectures/FIBEROPTICS.pdf.

"Measurement of Optical Filters", Published on: Jul. 27, 2013 Available at: http://www.semrock.com/measurement-of-optical-filters.aspx.

Johnston, Hamish., "Frequency comb takes a measure of distance", Published on: May 10, 2012 Available at: http://physicsworld.com/cws/article/news/2012/may/10/frequency-comb-takes-a-measure-of-distance.

Mochizuki, et al., "Optical Fiber Dispersion Measurement Technique Using a Streak Camera", In Journal of Lightwave Technology, vol. 5, Issue 1, Jan. 1987, pp. 119-124.

Navruz, et al., "Smart-phone based computational microscopy using multi-frame contact imaging on a fiber-optic array", In Journal of Lab Chip, Issue 20, Oct. 21, 2013, 9 pages.

"International Search Report and Written Opinion Issued in PCT Application No. PCT/US2017/029737", dated Jul. 13, 2017, 10 Pages.

\* cited by examiner

METHODS AND SYSTEMS FOR PROVIDING A FIBER OPTIC CABLE NETWORK TESTING PLATFORM

BACKGROUND

Optical fibers refer to flexible transparent fibers used as a means to transmit light. As such, optical fibers are used in fiber optic communication to transfer information between locations based on sending pulses of light. In particular, optical fiber cables contain one or more optical fibers used to carry light. Fiber optic cables are used in many different industries and applications. For example, datacenters rely on fiber optic cables (e.g., an installed datacenter fiber optic cable network) to connect different computing components in the datacenter for communication and performing datacenter operations. A fiber optic cable network needs to be tested for several reasons including: to verify proper operation of the fiber optic cable network to specified industry standards, to verify proper operation of equipment using the fiber optic cable network, to verify communication equipment is working to specifications, and to document features of fiber optic cable network.

SUMMARY

Embodiments described herein provide methods and systems for providing a fiber optic cable network testing platform. The fiber optic cable network platform can generally refer to components, modules, and sub-systems integrated to leverage a mobile device and a fiber optic cable network testing adapter. The testing platform operates to test a fiber optic cable network and generate and communicate fiber optic cable network information in an integrated manner. Testing and troubleshooting the fiber optic cable network supports verifying and documenting the operating status of components in the fiber optic cable network.

In operation, the adapter is removably attached to the mobile device to facilitate testing the fiber optic cable network via the mobile device. The adapter is designed to be physically coupled next to a camera of the mobile device on one end and physically coupled to a fiber optic cable on another end. A fiber optic cable being tested is then attached to the adapter. The adapter includes several components to support fiber optic cable network testing operations. A sensor can support determining the type of cable that is connected to the adapter. An optical device can support transmitting fiber optic cable light to a camera on the mobile device. The camera receives the light from the optical cable and communicates light data received at the camera. The mobile device further includes an application that supports accessing the light data, analyzing the light data to generate test results data and communicating the test results data. In particular, the application can support analyzing the light to identify and verify specific selected functionality (e.g., peak wavelengths or bit error checking) of the fiber optic cable network. The fiber optic testing application can also communicate the test results data, which are generated, to different types of interfaces for reviewing the test results data. In this regard, the mobile device and the adapter assembly support an integrated and portable solution for testing and providing and documenting the testing results data of a fiber optic cable network.

BRIEF DESCRIPTION OF THE DRAWINGS

The present invention is described in detail below with reference to the attached drawing figures, wherein.

DETAILED DESCRIPTION

Embodiments described herein provide methods and systems for providing a fiber optic cable network testing platform ("testing platform"). The fiber optic cable network platform can generally refer to components, modules, and sub-systems that are integrated to leverage a mobile device and a fiber optic cable network testing adapter. The testing platform operates to test a fiber optic cable network and generate and communicate fiber optic cable network information, particularly test results data, in an integrated manner. Testing and troubleshooting the fiber optic cable network supports verifying and documenting operating status of components in the fiber optic cable network.

Current tools for testing a fiber optical cable network have several shortcomings, in that, the tools and measurement equipment are often bulky, cumbersome and dedicated specialized devices, having several different components (e.g., batteries, adapters, chargers and software) that can be relatively expensive. In addition, current tools do not have the capacity to communicate wirelessly with each other over wireless networks (e.g., cellular networks) to provide information about the testing to external components in real-time. Further, with these many specialized tools and components, there exist limited interoperability and integration between components to properly and efficiently document the status of a fiber optic cable network. As such, a solution for addressing the above-described issues would improve operations for testing and providing the status of a fiber optic cable network.

In operation, the fiber optic cable network testing adapter ("adapter assembly") is removably attached (e.g., via an attachment component) to the mobile device (e.g., smartphone or tablet) to facilitate testing the fiber optic cable network via the mobile device. The adapter assembly is designed to be physically coupled next to a camera of the mobile device on one end and physically coupled (e.g., via a port component) to a fiber optic cable on another end. A fiber optic cable being tested is then attached to the adapter. The adapter assembly includes several components to support fiber optic cable network testing operations. A sensor (e.g., an adapter sensor component) can support determining the type of cable that is connected to the adapter. An optical device (e.g., a monochromator) can support transmitting fiber optic cable light to a camera on the mobile device. The camera of the mobile device receives the light from the fiber optic cable and communicates light data received at the camera. The mobile device further includes a fiber optic cable network testing application "testing application" that supports accessing the light data, analyzing the light data to generate test results data and communicating the test results data. In particular, the testing application can support analyzing the light to identify and verify specific characteristics (e.g., peak wavelengths or bit error checking) of fiber optic cable network based on selected testing options. The testing application can also communicate the light data and test results data, that are received and generated, respectively, to different types of interfaces for reviewing the light data and test results data. In this regard, the mobile device and the adapter assembly support an integrated and portable solution for testing and documenting the testing results data of a fiber optic cable network.

Figure 1:
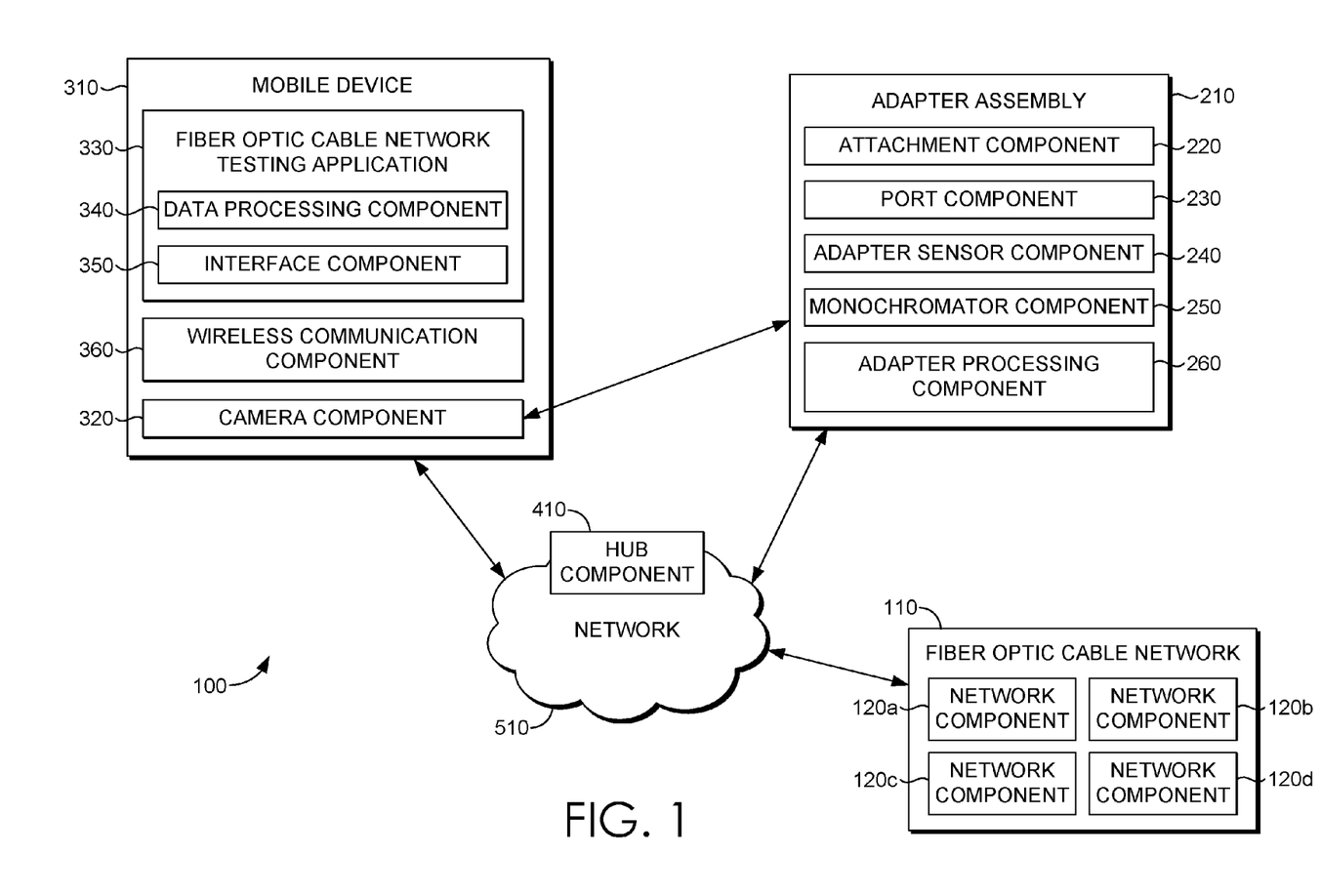
FIG. 1 is a block diagram of an exemplary fiber optic cable network testing platform operating environment, in which embodiments described herein may be employed.

Accordingly, with reference to FIG. 1, the fiber optic cable network testing platform 100 ("testing platform") provides integrated functionality based on the components of the platform described herein. The testing platform 100 includes a fiber optic cable network 110, an adapter assembly 210, and a mobile device 310. The fiber optic cable network 110 further includes one or more network components (e.g., network components 120a, 120b, 120c, 120d); the adapter assembly 210 further includes an attachment component 220, a port component 230, an adapter sensor component 240, a monochromator 250 and an adapter processing component 260; and the mobile device 310 includes a camera component 320, a fiber optic cable network testing application component 330 ("application component") having an data processing component 340, and an interface component 350. The mobile device 310 further includes a wireless communication component 360 operably coupled to a hub component 410 and network 510. The network 510 may include, without limitation, one or more local area networks (LANs) and/or wide area networks (WANs). Such networking environments are commonplace in offices, enterprise-wide computer networks, intranets and the Internet. Accordingly, the network is not further described herein.

A platform as used herein refers to any system, computing device, process, or service or combination thereof. A platform may be implemented as hardware, software, firmware, a special-purpose device, or any combination thereof. A platform may be integrated into a single device or it may be distributed over multiple devices. The various components of a platform may be co-located or distributed. The platform may be formed from other platforms and components thereof.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The fiber optic cable network 110 refers to an interconnection of fiber optic cable network components that support communicating information. In particular, communication of information can be based on transmission of light via one or more optical wavelength signals. In this regard, testing the fiber optic cable network can refer to testing the optical wavelength signals being transmitted by the fiber optic cable network. Fiber optic cable network 110 can specifically be linked using several network components (e.g., network components 120a, 120b, 120c, 120d) that direct the flow of data communicated using the network components, especially fiber optic cables. A fiber optic cable network, by way of example, can be associated with a datacenter that operates to store and distribute data. Within a datacenter, a plurality of fiber optic cables can be linked together and interconnected between datacenter components that are network components. Datacenter components can include servers, racks, network switches, routers and other computing and network devices that facilitate providing datacenter functionality. Datacenter components, in particular, communicate based on the linked and interconnected fiber optic cables of the fiber optic cable network 110. Other variations of fiber optic cable networks are contemplated with embodiments of the present invention. Embodiments of the present invention operate to test and document test results data for a selected fiber optic cable network, as described herein in more detail.

Figure 2:
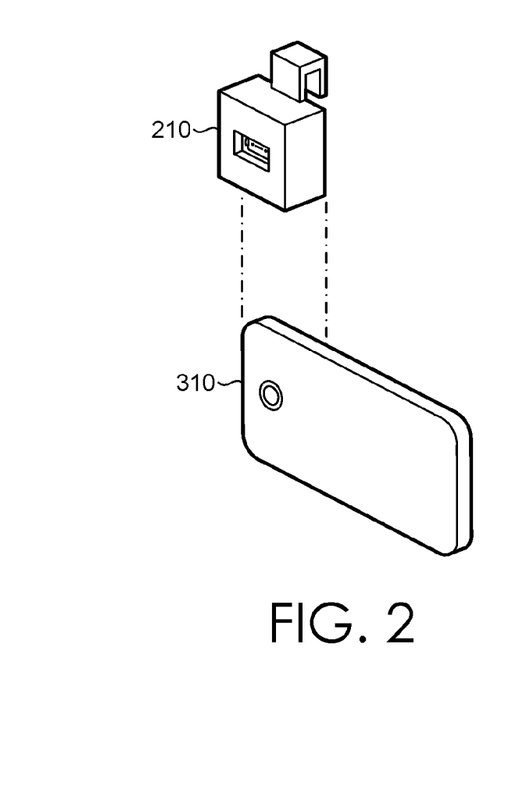
FIG. 2 is an illustration of a fiber optic cable network testing adapter and mobile device, in accordance with embodiments described herein.
Figure 3:
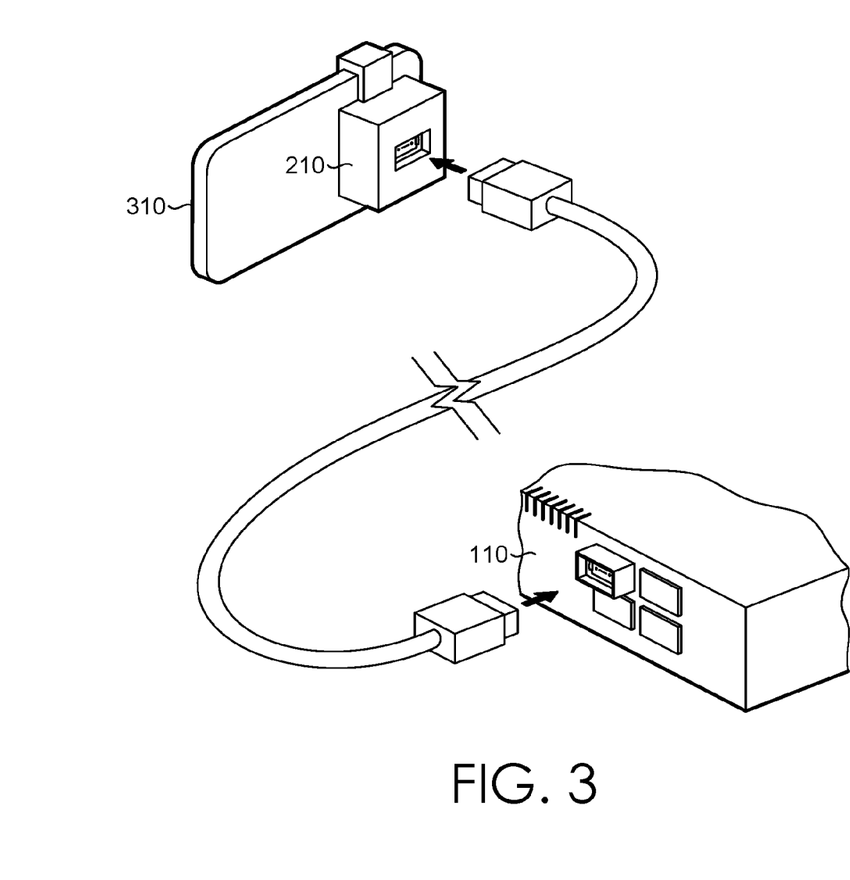
FIG. 3 is an illustration of a fiber optic cable network testing adapter coupled to a mobile device, in accordance with embodiments described herein.

With reference to FIGS. 2 and 3, the combination of the adapter assembly 210 and the mobile device 310 facilitate providing the functionality of the testing platform 100. The adapter assembly 210 supports converting the mobile device 310 into a portable and integrated fiber optic cable network testing tool within the testing platform 100. As illustrated, the adapter assembly 210 is removably attachable to the mobile device, proximate a camera lens portion of the camera. The adapter assembly 210 includes several components that operate to attach the adapter assembly 210 to the camera, connect to a fiber optic cable network (e.g., via a fiber optic cable) and communicate fiber optic cable light via the camera of the mobile device 310 to an application on the mobile device 310.

The adapter assembly 210 includes an attachment component 220, a port component 230, an adapter sensor component 240, a monochromator 250, and an adapter processing component 260, as shown in FIG. 1. The attachment component 220 is a mechanism configured to attach the adapter assembly 210 to the mobile device 310. The attachment component 220 can attach the adapter assembly 210 in a portion proximate the camera of the mobile device 310. The attachment component 220 can be configured such that the mobile 210 stays portable and mobile and not completely encumbered by the adapter assembly. The adapter assembly 210 is attached such that light from a fiber optic cable is transmitted from an attached fiber optic cable via the adapter assembly 210 to the camera of the mobile device 310. The attachment component 220 can be include any variations of retainer elements—clips, clamps, and latches—that put the mobile device 310 in contact and attach the mobile device to the adapter assembly 210. Also, the adapter assembly 210 may be part of a mobile device case or enclosure that encloses, fully or partially, the mobile device 310. In embodiments, the adapter assembly 210 can support testing of fiber optic cables that include multiple cables within a ribbon. The adapter assembly 210 can include a slider mechanism that selectively identifies each cable in a ribbon of cables, such that, processing is based on light data received from the selected cable. Other variations or combinations of attachment components are contemplated with embodiments described herein.

The port component 230 operates as an endpoint to receive the fiber optic cable that is being tested. The port component 230 operates to support communicating fiber optic light from the fiber optic cable. The port component 230 can be configured to receive different types of fiber optic cable connectors (e.g., ferule connector (FC), fiber-jack (FJ), mechanical transfer (MT), mechanical transfer registered jack (MT-RJ), subscriber connector (SC) FC, lucent connector (LC), straight tip (ST)) that may have different fiber cores operating with multimode or single mode fiber. The port component 230 can receive each type of connector based on the internal physical port configuration of the port component 230. In this regard, the port component 230 may operate as a universal coupler for the different types of fiber optic cables. In other embodiments, the port component 230 may operate as a removable port component that can be coupled and decoupled from the adapter assembly 210 to accommodate the particular fiber optic cable connector type of a fiber optic cable. In this regard, several different port components may exist for corresponding connectors of fiber optic cables. The port component 230 in any configuration operates to properly communicate the fiber optical cable light or signal to the mobile device 310.

An adapter sensor component 240 can be implemented in the adapter assembly 210 to help detect the type of fiber optic cable currently attached to the adapter assembly 210. The adapter sensor component 240 may detect a physical configuration of the fiber optic cable or the type of removable port component connected to the adapter assembly 210. The adapter sensor component 240 may also advantageously detect the type of light received from the fiber optic cable to determine the type of fiber optic cable coupled to the adapter assembly 210. The adapter sensor component 240 may also communicate information about the type of fiber optic cable that is detected. It is contemplated that adapter sensor component 240 may operate with the adapter processing component 260 to send a signal (e.g., BLUETOOTH signal) to the mobile device 210 and the testing application component 330 indicating the type of fiber optic cable attached to the adapter assembly 210. In some embodiments, the adapter sensor component 240 functionality is provided by way of the camera component 320 where the camera component 320 can detect the physical configuration or transmitted signal to facilitate detecting the type of fiber optic cable connected to the adapter assembly 210. The camera component 320 can communicate information to the fiber optic cable network testing application component 330 such that the type of fiber optic cable is determined. Upon connecting a fiber optic cable to the adapter assembly 210, the fiber optic cable can transmit light through the adapter assembly 210 to the camera of the mobile device 310.

The adapter assembly 210 also includes a monochromator component 250 that operates as a light channel for a selected wavelength from a range of wavelengths from the light of an attached fiber optic cable. The monochromator component 250 channels light, in that, it allows light from the cable to pass through. The monochromator component 250 can be tuned using a tuning mechanism (e.g., a knob or tuning ring) to a particular wavelength. The monochromator component 250 operates based on optic dispersion in a dispersive element (e.g., a prism) or a diffraction using diffraction grating to separate colors. The monochromator component 250 can include a dispersive element and entrance slit and mirrors to create a parallel beam similar to sunlight, and an exit slit and mirrors to extract the monochromatic light. In embodiments, two monochromators may be implemented. The two monochromators can be implemented so they both select the same color to lower the cutoff level. The monochromator component 250 can be calibrated using the testing application component 330. Non-selected wavelengths are filtered from reaching the mobile device. The monochromator component 250 can be calibrated on specific wavelengths and in operation tuned to specific wavelengths to verify the monochromator is isolating the correct wavelength ranges and operates accordingly. It is contemplated that the overall calibration of the testing platform 100, as a measurement tool, can include the monochromator component 250 and/or a photodiode sensor of the camera component 320 via a collimated beam or optical fiber/connector configuration. Other variations and combinations of calibrating the monochromator component 250 and the testing platform 100 are contemplated with embodiments described herein. The monochromator component 250 operates to channel light in the selected wavelength so that the testing application component 330 can analyze the light in the selected wavelength. The monochromator component 250 can channel light and the light is evaluated to determine peak power levels of the light at the particular optical wavelengths, as described further herein.

The mobile device 310 operates as a fiber optic cable testing tool based on the adapter assembly 110 removably attached to the mobile device 310. The mobile device 310 includes the camera component 320 that receives and processes the light from the fiber optic cable coupled to the adapter assembly. The camera component 320 includes a photodiode sensor that coverts light into current. The photodiode sensor can include optical filters and built-in lenses, the optical filters may selectively transmit light of different wavelengths while the lens converges or focuses the light. It is contemplated that the optical filters in the camera component 320 can be utilized independently of the monochromator component 250 or in combination with the monochromator component 250 to support the functionality of the filtering wavelengths for analyzing light data as described herein. The camera component 320 processes and communicates the optical light from the fiber optic cable as light data to the testing application component 330.

The testing application component 330 provides an interface for testing the fiber optic cable network. The testing application 330 operates based on the data processing component 340 and an interface component 350 of the mobile device. The data processing component 340 performs actions based on input into the testing application 330 to support the functionality of the testing platform 100. For example, the data processing component 340 receives light data and performs calculations to generate test results data based on the light data. The interface component 350 operates as a point of communication and interaction with the testing application 330. The interface component 350 supports a user interface for receiving user input and a data interface for receiving data (e.g., light data, calibration data) and communicating data (e.g., test results data) for the testing application component 330. For example, the interface component 350 may communicate via the wireless communication component 360 with a hub component 410 to centrally store data for a plurality of mobile devices and also to share data between a plurality of mobile devices.

The testing application component 330 can be controlled based on user input for testing the fiber optic cable network 110. The user can select one of several testing features or options for configuring the testing application component 330 and testing the fiber optic cable network 110. The testing application component 330 includes a calibration option that allows the user to calibrate components of the testing platform 100 as described herein. The calibration option can support selections for calibrating the monochromator, the optical filters in the photodiode sensor, or the optical power meter measurements of the mobile device 310. Calibration can be performed based on algorithms programmed into the testing application component 330 and standards that afford the testing application component 330 to compare expected readings to actual readings of the different components being calibrated. The calibration interface can specifically provide a user selectable option to calibrate based on verifying known optical power levels, peak power levels, wavelengths, and bit errors such that the readings of during testing are accurate. Other variations and combinations of calibration are contemplated with embodiments described herein.

At a high level, during testing, the testing application component 330 receives light data transmitted from the adapter assembly 210 via the camera component 320. The data processing component 340 is responsible for receiving and analyzing the light data. The light data can specifically refer to the optical wavelength signals received from the fiber optical cable network via the one or more network components of the fiber optic cable network. The data processing component 340 analyzes the light data based on the selected options and configurations of the testing option of the testing application component 330. For example, the data processing component 340 can determine the power levels of the light signal when a user is testing the power output that indicates the actual power through a cable. The power output can help generate test results data corresponding to loss where loss is a relative power measurement, that is, the difference between the power coupled into the fiber optic cable and the power transmitted through the fiber optic cable. It is contemplated that a variety of network components may be similarly tested for loss and other testing options defined herein.

In one embodiment, the data processing component 340 can specifically identify optical wavelength signals and the peak power levels for light at that wavelength. This is different from power measurements that are timed average power. The pulse measurements can be a function of a known duty cycle to calculate the peak power levels. The testing application component 330 can support detecting peak power levels for dense wavelength division multiplexing in order to determine the number of channels present and the power levels for each specific channel. It is contemplated that the testing application component 330 allows the user to make a selection for particular wavelength being testing. The data processing component 340 can also perform bit error checking. Bit errors in optical light data can refer to the number of received bits of the light data that have been altered during transmission. Bit errors can also be associated with specific optical wavelength signals that are identified in the light data that is transmitted. The testing application component 330 can support determining a bit error rate estimate for each wavelength based on common test parameters configured by the user. Bit errors can be due to several different factors that affect the optical cable light signal. The data processing component 340 may receive an expected test pattern (e.g., from the hub component 410 or a second mobile device) via the interface component 320 and then receive light data through the fiber optic cable that is compared to identify bit errors. Other variations and combination of data processing for tests are contemplated with embodiments described herein.

The testing application component 330 can operate with the interface component 350 to communicate with other components to provide integrated fiber optic cable network testing functionality. The testing application component 330 can communicate light data and test results data that are received and generated, respectively, to different types of interfaces for review of the light data and test results data. For example, the light data can be transmitted over a mobile network to other mobile devices or consumers of data in order to perform post processing and analysis. The testing application component 330 can operate with a second mobile device or a hub component 410. The testing application component 330 can communicate based on Application Programming Interfaces (e.g., routines and protocols) associated with testing application component 330. For example, the second mobile device or hub component 410 can communicate data to the testing application component 330 to facilitate performing functionality described herein, and in particular using APIs shared between the mobile device 310, the second mobile device and the hub component 410. The testing application component 330 can also communicate with the using the wireless communication component 360 component to receive different types of communications (e.g., BLUETOOTH) and data for operating the testing application component 330. The testing application component 330 can communicate testing results data to a second mobile device or a hub component.

The testing platform 100 operates in an integrated manner in that the testing platform can support a mobile device having an adapter assembly, at least one second mobile device and a hub component 410 to communicate with the mobile device 310. The second mobile device and hub component 410 can receive testing results data to support a unified testing platform 100. The test results data can now be made available on the second mobile and a hub component 410. In particular, the hub component 410 can operate to aggregate and communicate the aggregated test results data. The second mobile device and hub component 410 can also communicate predefined calibration data, predetermined testing data, and documentation templates for capturing, storing, communicating and presenting testing results data. In one embodiment, the hub component can include a topographic representation of a fiber optic cable network 110. The topographic representation can include the different network components and specifically network components to be tested. The topographic representation can be distributed to the mobile device 310 and the second mobile device such that as testing is completed with the portable testing devices by way of the adapter assembly, the topographic representation is updated via the testing application components of the mobile devices. In particular, testing results data associated with elements of the topographic representation are populated and shown as part of the topographic representation. The topographic representation can be communicated between the mobiles devices and the hub component 410 to dynamically update the topographic representation of the fiber optic cable network 110. In this regard, a visual representation of the testing results data and the progress in testing performed for the fiber optic cable network is readily available via one or more user interfaces. Other variations and combinations of communications and integrated functionality between the hub component 410 and a plurality of mobile devices in the testing platform 100 are contemplated with embodiments of the present invention.

Figure 4:
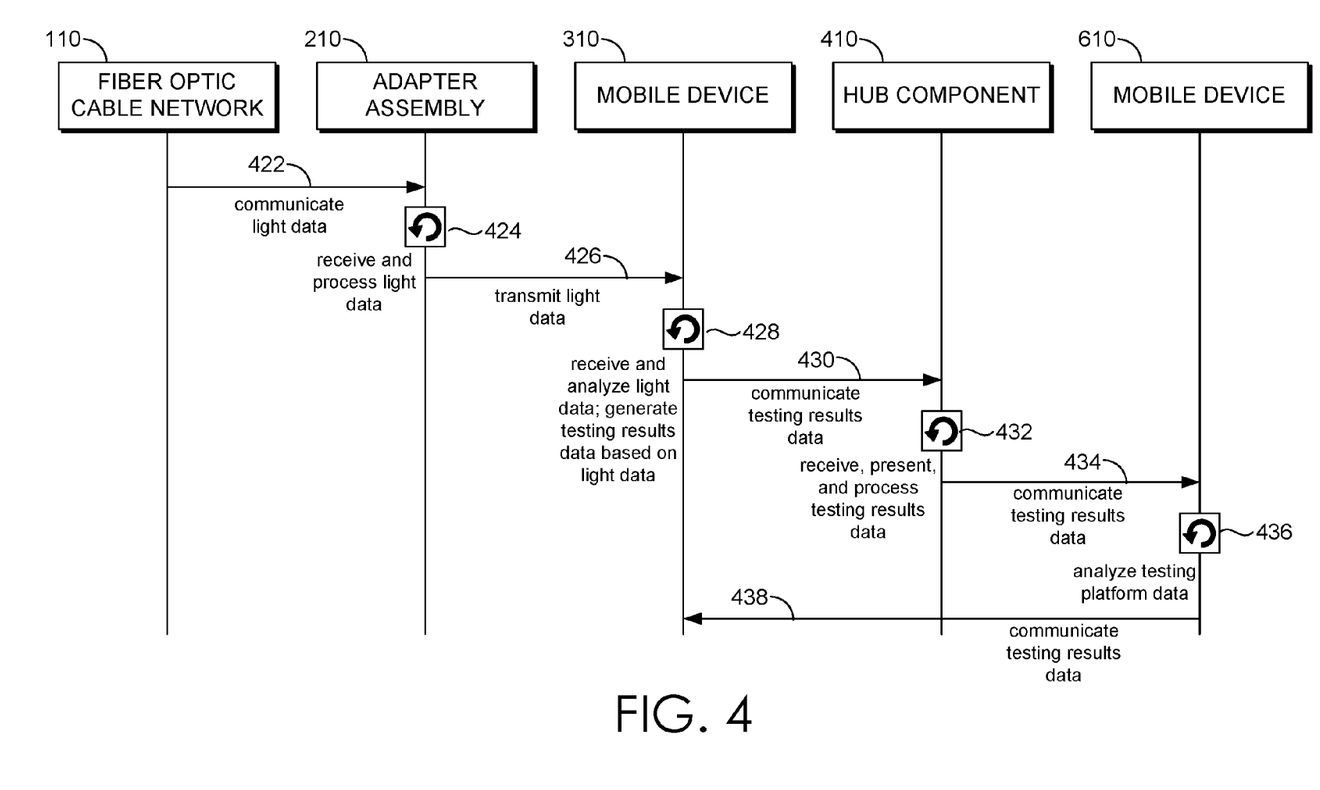
FIG. 4 is a flow diagram showing an exemplary method for implementing functionality of a fiber optic cable network testing platform, in accordance with embodiments described herein.

Turning now to FIG. 4, a high level schematic is illustrated for implementing functionality of a fiber optic cable network testing platform. FIG. 4 includes a fiber optic cable network 110, an adapter assembly 210, a mobile device 310 a hub component 410, and a mobile device 610 as described herein above. Initially at step 422, data (e.g., fiber optic light-based data) is communicated from the fiber optic cable network 110 to the adapter assembly 210. The adapter assembly includes attachment component and a port component, the attachment component is a mechanism configured to attach the adapter assembly 210 to the mobile device 310, the port component is configured to receive a fiber optic cable, the fiber optic cable is connected to the fiber optic cable network 110. At step 424, light data is received at the adapter assembly from the fiber optic cable connected to the fiber optic cable network 110.

At step 426, the light data is transmitted to a fiber optic cable network testing application of mobile device 310. The light data can be transmitted upon being processed by one or more components of the adapter assembly. For example, an adapter sensor component of the fiber optic cable network testing adapter assembly can be configured to automatically detect and communicate information about a type of fiber optic cable connected to the fiber optic cable network testing adapter assembly. A monochromator component may transmit light of a selected wavelength from the fiber optic cable to the fiber optic cable network testing application component.

At step 428, the light data is received at the fiber optic cable network testing application. The light data is received from a camera component of the mobile device 310. The camera component support processing the light data from the adapter assembly and transmitting the light data to the testing application. The light data is further analyzed based on fiber optic cable network testing options, received via the testing application, to generate testing results data. The testing results data is generated based on the testing options. The fiber optic cable network testing options include an optical power meter option, a peak power level option, and a bit error checking option. The mobile device 310 can support communicating the testing results data via an interface that facilitates presenting the testing results data. In particular, at step 430, the mobile device 310 communicates testing results data using an interface associated with the hub component 410. It is contemplated that the mobile device 310 can also communicate testing results data to the mobile device 610.

At step 432, the hub component 410 can receive, present and/or process communicate the testing results data. For example, the hub component 410 can support presenting test results data from one or more mobile devices of the testing platform, via a dashboard that supports a unified view of testing results data. The hub component 410 can also process the testing results data, with reference to other testing results data received from mobile devices of the testing platform. For example, the hub component 410 may communicate testing results data from the mobile device 310 to mobile device 610 before or after performing comparative analysis of testing results data of one or both of the mobile devices. In particular, at step 434, the hub component 410 communicates testing results data to the mobile device 610.

At step 436, the mobile device 610 receives testing platform data—testing results data or other types of data (e.g., calibration data) from the hub component 410. The mobile device 610 can process the received data based on existing data at the mobile device or based on performing additional testing at the mobile device 610. For example, the mobile device 610 can communicate with the fiber optic cable network 110 and perform testing based on an adapter assembly of the mobile device 610. The mobile device 610 can also operate with the mobile device 310 to perform additional comparative analysis of the fiber optic cable network. For example, at step 438, the mobile device 410 communicates testing results data to the mobile device 310. Receiving the testing results data from the mobile device 610 supports performing, viewing, managing fiber optic cable network testing in an integrated way.

Figure 5:
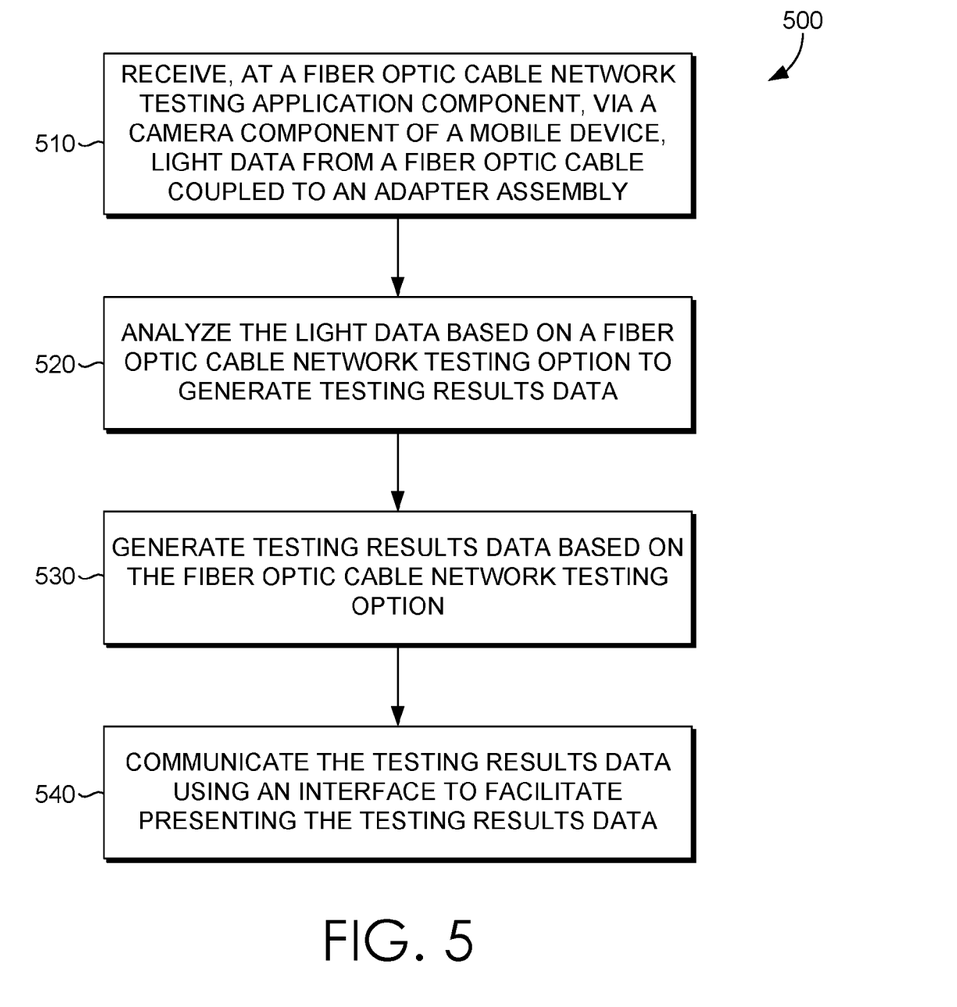
FIG. 5 is a flow diagram showing an exemplary method for implementing functionality of a fiber optic cable network testing platform, in accordance with embodiments described herein.

Turning now to FIG. 5, a flow diagram is provided that illustrates a method for implementing functionality of a fiber optic cable network testing platform. Initially at block 510, light data from a fiber optic cable is received, at a fiber optic cable network testing application component, via a camera component of a mobile device. The fiber optic cable is coupled to a fiber optic cable network testing adapter assembly to transmit the light data to the fiber optic cable network testing application component of a fiber optic cable network testing platform. The fiber optic cable network testing platform provides integrated fiber optic cable network testing. At block 520, the light data is analyzed based on a fiber optic cable network testing option to generate testing results data. At block 530, testing results data is generated based on a fiber optic cable network testing option. At block 540, the testing results data is communicated to an interface that facilitates presenting the testing results data.

Figure 6:
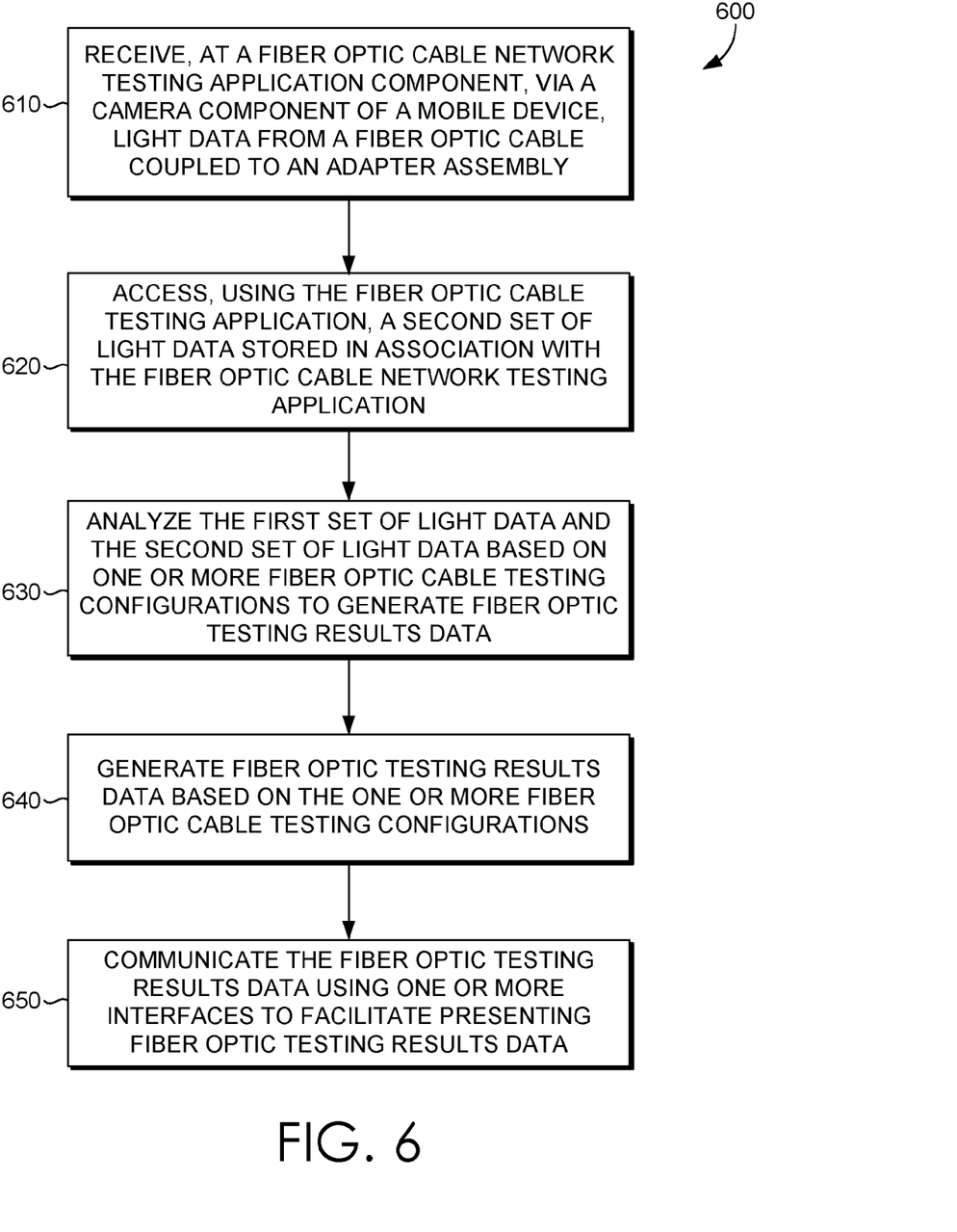
FIG. 6 is a flow diagram showing an exemplary method for implementing functionality of a fiber optic cable network testing platform, in accordance with embodiments described herein.

Turning now to FIG. 6, a flow diagram is provided that illustrates a method for implementing functionality of a fiber optic cable network testing platform. At block 610, a first set of light data from a fiber optic cable is received at a fiber optic cable testing application via a mobile device camera. The fiber optic cable is coupled to a fiber optic testing adapter to transmit the light data to the fiber optic cable network testing application of a fiber optic testing platform, The fiber optic testing platform provides integrated fiber optic cable network testing. At block 620, a second set of light data, stored in association with the fiber optic cable testing application, is accessed. At block 630, the first set of light data and the second set of light data are analyzed based on one or more fiber optic cable testing configurations to generate fiber optic testing results data. The one or more fiber optic cable testing configurations are used to compare the first set of light data to the second set of light data. At block 640, fiber optic testing results data are generated based on the one or more fiber optic cable testing configurations, the fiber optic results data include comparative test results elements of the first set of light data and the second set of light data. At block 650, the fiber optic testing results data is communicated to one or more fiber optic testing results data interfaces that facilitate presenting fiber optic testing results data based on a corresponding configuration of the one or more fiber optic testing results data interfaces.

With reference to the testing platform 100, embodiments described herein can improve fiber optic cable network testing. The fiber optic cable network testing platform components refer to integrated components that implement fiber optic cable network testing. The integrated components refer to the hardware architecture and software framework that support functionality using the fiber optic cable network testing. The hardware architecture refers to physical components and interrelationships thereof and the software framework refers to software providing functionality that can be implemented with hardware operated on a device. The end-to-end software-based fiber optic cable network testing platform can operate within the platform components to operate computer hardware to provide platform functionality. As such, the fiber optic cable network testing platform components can manage resources and provide services for the fiber optic cable network testing functionality. Any other variations and combinations thereof are contemplated with embodiments of the present invention.

By way of example, the fiber optic cable network testing platform can include an API library that includes specifications for routines, data structures, object classes, and variables may support the interaction the hardware architecture of the device and the software framework of the testing platform. These APIs include configuration specifications for the fiber optic cable network testing platform such that the components therein can communicate with each other in the testing, as described herein.

Figure 7:
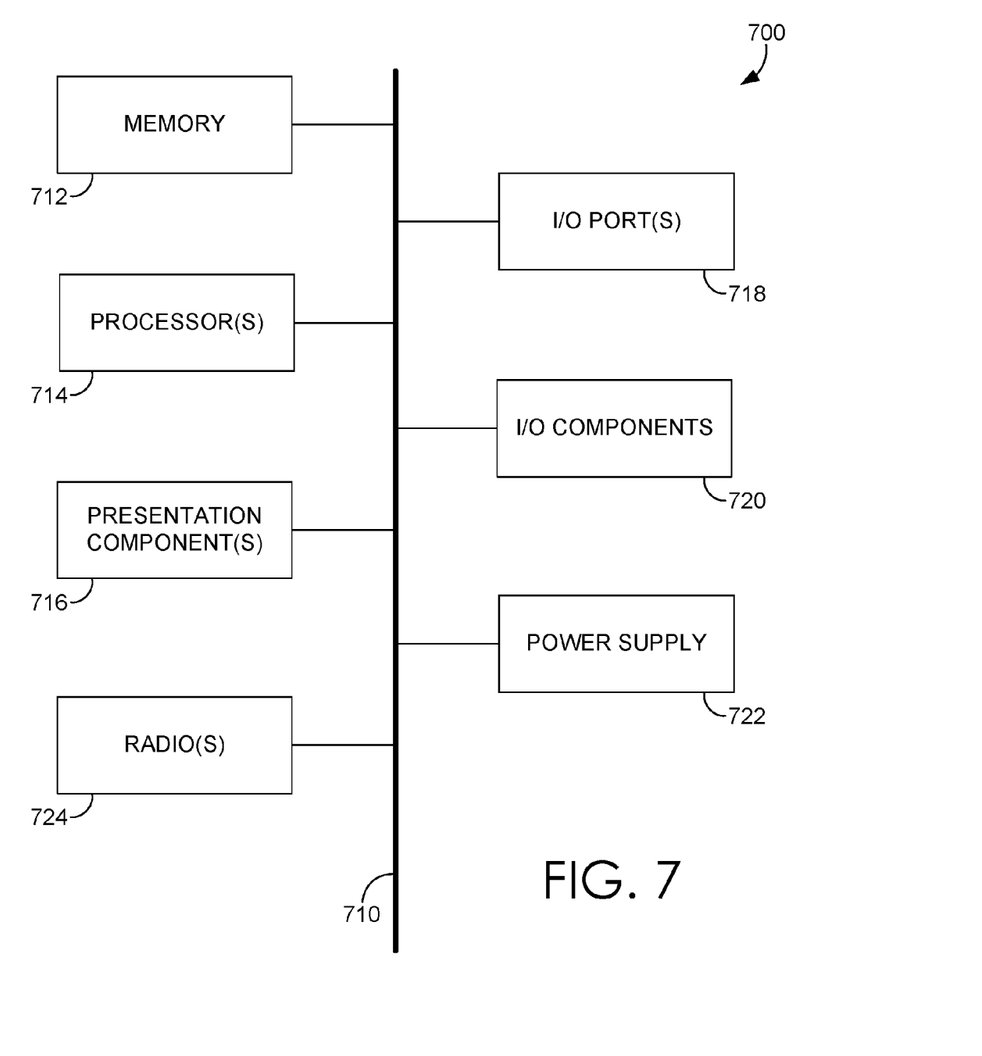
FIG. 7 is a block diagram of an exemplary computing environment suitable for use in implementing embodiments described herein.

Having described embodiments of the present invention, an exemplary operating environment in which embodiments of the present invention may be implemented is described below in order to provide a general context for various aspects of the present invention. Referring initially to FIG. 7 in particular, an exemplary operating environment for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes a bus 710 that directly or indirectly couples the following devices: memory 712, one or more processors 714, one or more presentation components 716, input/output ports 718, input/output components 720, and an illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 7 is merely illustrative of an exemplary computing device that can be used in connection with one or more embodiments of the present invention. Distinction is not made between such categories as "workstation," "server," "laptop," "hand-held device," "mobile device," "wearable device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" involves "receiving," "referencing," or "retrieving." In addition, words such as "a" and "an," unless otherwise indicated to the contrary, include the plural as well as the singular. Thus, for example, the constraint of "a feature" is satisfied where one or more features are present.

Also, the term "or" includes the conjunctive, the disjunctive, and both (a or b thus includes either a or b, as well as a and b).

For purposes of a detailed discussion below, embodiments are described with reference to distributed computing devices, components, and a fiber optic cable network testing platform that supports implementing fiber optic cable network testing. Components can be configured for performing novel aspects of embodiments, where configured for includes programmed to perform particular tasks or implement particular abstract data types using code. It is contemplated that the methods described herein can be performed in different types of operating environments having alternate configurations of the functional components described herein. As such, the embodiments described herein are merely exemplary, and it is contemplated that the techniques may be extended to other implementation contexts.

Embodiments presented herein have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A system for implementing fiber optic cable network testing, the system comprising:
  a fiber optic cable network testing adapter assembly comprising an attachment component and a port component, the attachment component is a mechanism configured to attach the fiber optic cable network testing adapter assembly to a mobile device, the port component is configured to receive a fiber optic cable; and
  a fiber optic cable network testing application component configured to:
    receive, via a camera component of the mobile device, light data from a fiber optic cable, wherein the fiber optic cable is coupled to the port component of the fiber optic cable network testing adapter assembly to transmit the light data to the fiber optic cable network testing application component of a fiber optic cable network testing platform, wherein the fiber optic cable network testing platform provides integrated fiber optic cable network testing;
    analyze the light data based on a fiber optic cable network testing option to generate testing results data;
    generate the testing results data based on the fiber optic cable network testing options; and
    communicate the testing results data using an interface to facilitate presenting the testing results data.

2. The system of claim 1, wherein an enclosure comprises the attachment component, wherein the enclosure, at least partially, encloses the mobile device; and wherein the port component is a removable component having a port configuration for a specific connector type of fiber optic cable.

3. The system of claim 1, further comprising an adapter sensor component of the fiber optic cable network testing adapter assembly configured to automatically detect and communicate information about a type of fiber optic cable connected to the fiber optic cable network testing adapter assembly.

4. The system of claim 1, further comprising a monochromator component configured to transmit light of a selected wavelength from the fiber optic cable to the fiber optic cable network testing application component.

5. The system of claim 1, wherein the fiber optic cable network testing further includes a calibration option for calibrating a selected component of the fiber optic cable network testing platform, based at least in part on the fiber optic network testing application component.

6. The system of claim 1, wherein in the fiber optic cable network testing options include an optical power meter option, a peak power level option, and a bit error checking option.

7. The system of claim 1, wherein analyzing the light data is based on a second set of testing results data from a second mobile device or a hub component within the fiber optic cable network testing platform to generate integrated test results data based on comparative analysis of the test results data associated with the mobile device and the second test results data.

8. The system of claim 7, wherein the fiber optic cable network testing platform comprises the hub component supporting the mobile device and the second mobile device operably coupled to communicate testing results data.

9. A computer-implemented method for implementing fiber optic cable network testing, the method comprising:
  receiving, at a fiber optic cable network testing application component, via a camera component of a mobile device, light data from a fiber optic cable, wherein the fiber optic cable is coupled to a fiber optic cable network testing adapter assembly to transmit the light data to the fiber optic cable network testing application component of a fiber optic cable network testing platform, wherein the fiber optic cable network testing platform provides integrated fiber optic cable network testing;
  analyzing the light data based on a fiber optic cable network testing option to generate testing results data;
  generating testing results data based on the fiber optic cable network testing option; and
  communicating the testing results data using an interface to facilitate presenting the testing results data.

10. The method of claim 9, wherein the fiber optic cable network testing adapter assembly further includes an attachment component, a port component and a monochromator component, the monochromator channels light of a selected wavelength from the fiber optic cable to the fiber optic cable network testing application.

11. The method of claim 9, wherein the fiber optic cable network testing application component operates with a hub component or a second mobile device to communicate the testing results data.

12. The method of claim 9, wherein in the fiber optic cable network testing options include an optical power meter option, a peak power level option, and a bit error checking option.

13. The method of claim 9, further comprising:
  receiving a second set of data, the second set of data comprising test results data or calibration data;
  comparing the second set of data to the test results data from the mobile device to generate integrated test results data;
  generating the integrated test result data; and communicating the integrated test results data using the interface that facilitates presenting the integrated testing results data.

14. The method of claim 13, wherein the second set of data is a second set of test results data from a second mobile device within the fiber optic cable network testing platform that is used to generate integrated test results data based on comparative analysis of the test results data associated with the mobile device and the second test results data.

15. The method of claim 14, further comprising:
receiving a topographic representation of a fiber optic cable network associated with the fiber optic cable;
updating the topographic representation with the testing results data; and
communicating the topographic representation.

16. One or more computer storage media having computer-executable instructions embodied thereon that, when executed, by one or more processors, cause the one or more processors to perform a method for implementing fiber optic cable network testing, the method comprising:
receiving, at a fiber optic cable testing application via a camera component of a mobile device, a first set of light data from a fiber optic cable, wherein the fiber optic cable is coupled to a fiber optic cable network testing adapter assembly to transmit the light data to the fiber optic cable network testing application component of a fiber optic cable network testing platform, wherein the fiber optic cable network testing platform provides integrated fiber optic cable network testing;
accessing, using the fiber optic cable testing application, a second set of light data stored in association with the fiber optic cable network testing application;
analyzing the first set of light data and the second set of light data based on one or more fiber optic cable testing configurations to generate fiber optic testing results data, wherein the one or more fiber optic cable testing configurations are used to compare the first set of light data to the second set of light data;
generating fiber optic testing results data based on the one or more fiber optic cable testing configurations, wherein the fiber optic results data include comparative test results elements of the first set of light data and the second set of light data; and
communicating the fiber optic testing results data using one or more interfaces to facilitate presenting fiber optic testing results data.

17. The media of claim 16, wherein the fiber optic cable network testing adapter assembly further includes an attachment component, a port component and a monochromator component, the monochromator channels light of a selected wavelength from the fiber optic cable to the fiber optic cable network testing application.

18. The media of claim 16, wherein a second set of light data is one of a second set of testing results data or calibration data.

19. The media of claim 16, wherein comparative test results elements are based on fiber optic cable network testing options including an optical power meter option, a peak power level option, and a bit error checking option.

20. The media of claim 16, communicating the fiber optic testing results data using a topographic representation to a hub component or a second mobile device.

* * * * *